US006436513B1

(12) United States Patent
Kitamura et al.

(10) Patent No.: US 6,436,513 B1
(45) **Date of Patent: *Aug. 20, 2002**

(54) INK JET RECORDING MATERIAL

(75) Inventors: Ryu Kitamura, Chiba; Tomomi Takahashi, Tokyo; Shunichiro Mukoyoshi, Ichikawa; Kazuaki Ohshima, Yokohama, all of (JP)

(73) Assignee: Oji Paper Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,234

(22) Filed: Sep. 15, 1998

(30) Foreign Application Priority Data

Sep. 17, 1997 (JP) .............................................. 9-251806
Oct. 3, 1997 (JP) .............................................. 9-271571

(51) Int. Cl.[7] .............................................. B32B 3/00
(52) U.S. Cl. .............................................. 428/195
(58) Field of Search .............................. 428/195, 206, 428/304.4, 331, 332, 520; 186/230, 242, 247; 427/218, 256, 332

(56) References Cited

U.S. PATENT DOCUMENTS 4,460,637 A 7/1984 Miyamoto et al.
4,503,118 A * 3/1985 Murakami et al. .......... 428/323
4,892,591 A 1/1990 Ogawa et al.
4,902,568 A 2/1990 Morohoshi
5,101,218 A * 3/1992 Sakaki et al. ................ 326/1.1
5,322,832 A * 6/1994 Takeyama et al. .......... 503/227
5,372,884 A * 12/1994 Abe et al. .................... 428/331
5,612,281 A * 3/1997 Kobayashi et al. ......... 503/227
5,718,793 A * 2/1998 Inamoto et al. ............. 156/235
5,958,168 A * 9/1999 Liu et al. .................... 156/230

FOREIGN PATENT DOCUMENTS

EP 0 685 344 12/1995
EP 0 791 474 8/1997
EP 0 803 374 10/1997
EP 0 879 709 11/1998
JP 57-87988 6/1982
JP 57-87989 6/1982
JP 63-166586 7/1988
JP 04-201594 * 7/1992 ............ B41M/5/00
JP 4-201594 7/1992
JP 7-68919 3/1995

* cited by examiner

*Primary Examiner*—Bruce H. Hess
*Assistant Examiner*—Michael Grendzynski
(74) *Attorney, Agent, or Firm*—Arent Fox Kintner Plotkin & Kahn

(57) ABSTRACT

An ink jet recording material having an excellent ink absorbing property and capable of recording ink images with superior gloss, water resistance and light resistance has an outermost ink receiving layer formed on a support and containing (1) fine pigment particles selected from amorphous silica secondary particles and alumina silicate secondary particles which have an average secondary particle size of 10 to 300 nm and in each of which a plurality of primary particles having an average primary particle size of 3 to 40 nm are agglomerated with each other, (2) an ultraviolet ray absorber and, optionally, (3) an antioxidant.

14 Claims, No Drawings

INK JET RECORDING MATERIAL

BACKGROUND OF THE INVENTION

1. Field of the Invention

The present invention relates to an ink jet recording material. More particularly, the present invention relates to an ink jet recording material having high gloss and color density of recorded images, and excellent water and light resistances.

2. Description of the Related Art

An ink jet recording system is employed to record colored ink images on a recording material by jetting imagewise ink droplets through nozzles at a high velocity to cohere the ink droplets on a surface of the recording material and is advantageous in that full color printing is easy and in that the printing noise is low. For this recording system, it is required that no clogging of the ink jet nozzles occurs, and the printed colored images exhibit bright colors. Therefore, the ink used for the ink jet recording system usually contains an acid dye or direct dye, and thus dyes having a high light fastness cannot be always selected at the present time.

As recording paper sheets for the ink jet recording system, woodfree paper sheets having an enhanced ink absorption and a coated paper prepared by coating a surface of the woodfree paper sheet with a porous pigment are widely available. However, these conventional paper sheets are disadvantageous in that when the ink images recorded on the conventional recording paper sheets are stored for long period, the ink images are significantly faded. Also, the conventional paper sheets are mostly mat-like ink jet recording sheets having a low surface gloss. Currently, in response to the rapid popularization of the ink jet printers and to the requirements for an improved quality of colored images, it is demanded to provide ink jet recording sheets having a high surface gloss, an excellent appearance and superior water and light resistances.

There are may reports concerning improvements of the light resistance of printed colored images. For example, Japanese Unexamined Patent Publications No. 57-87,988 and No. 57-87,989 disclose ink jet recording sheets to which an ultraviolet ray absorber or an antioxidant is added to improve the light resistance thereof. Also, Japanese Unexamined Patent Publication No. 63-166,586 discloses an ink jet recording sheet containing silica particles surface-treated with metal soaps, hydroxides, salts or oxides of a metal selected from Na, K, Ca, Mg, Al, Zn, Ba, Sr and Sn to enhance the light resistance of the recording sheet. Further, as reported in Japanese Unexamined Patent Publication No. 4-201,594, it is known that ultrafine particles of transition metal oxides are added to the ink receiving layer to support the inhibition effect of the ultraviolet ray absorbers on photodeterioration over long period. This type of the recording material exhibits a certain improvement in light resistance. However, this ink receiving layer is opaque, and a high gloss, a high color density of colored images, a high water resistance and a high light resistance cannot be obtained. This is probably because of the ink receiving layer formed from pigment particles having a particle size in the order of several micrometers. To impart a high gloss, a high color density of colored images and a high water resistance to the ink receiving layer, Japanese Unexamined Patent Publication No. 7-68,919 has reported that a support can be coated with a ultrafine pseudoboehmite sol porous ink receiving layer containing a mixture of an ultraviolet ray absorber or an antioxidant with a quencher. However, since the pseudoboehmite particles exhibit a low ink absorption capacity and a low ink-absorbing velocity, the above-mentioned ink jet recording sheet is unsuitable for high resolving power ink jet printers in which a large amount of ink is jetted to obtain a desired color density of colored images, and is unappropriate as a recording medium having a high gloss capable of recording photograph-like colored images.

The inventors of the present invention have attempted to provide ink jet recording materials having a high gloss, a high color density of colored images and a high ink absorption, and containing pigment secondary colloid particles having an average secondary particle size of 10 to 300 nm each consisting essentially of a plurality of primary particles having an average primary particle size of 3 to 40 nm and agglomerated with each other (EP-A-803374). The resultant recording material exhibits a high ink absorption and when ink jet printing is applied to the above-mentioned recording materials, the resultant colored images having excellent gloss, color density, water resistance and colored image quality compared to silver salt photographic images. However, this recording material is disadvantage in that when the resultant prints are stored for a long period, and especially when exposed to strong light, the colored images are faded or discolored.

SUMMARY OF THE INVENTION

An object of the present invention is to provide an ink jet recording material capable of recording colored images having excellent color density, gloss, water resistance and light resistance.

The above-mentioned object can be attained by the ink jet recording material of the present invention which comprises a support and a one or more ink-receiving layers formed on the support, wherein at least one of the ink receiving layers comprises:

(1) fine colloid pigment particles selected from fine colloid amorphous silica secondary particles and fine colloid alumina silicate secondary particles having an average secondary particle size of 10 to 300 nm and each consisting essentially of a plurality of primary particles having an average primary particle size of 3 to 40 nm and agglomerated with each other; and (2) an ultraviolet ray-absorber.

The above-mentioned ink receiving layer containing the fine colloid amorphous silica and/or alumina silicate particles and the ultraviolet ray absorber enables the colored images recorded on the resultant ink jet recording material to exhibit excellent color density, gloss, water resistance and light resistance. In a preferable embodiment of the present invention, the ink receiving layer containing the fine colloid amorphous silica and/or alumina silicate particles and the ultraviolet ray absorber further comprises an antioxidant.

The antioxidant contributes to enhancing the light resistance of the colored images recorded on the resultant ink receiving layer.

In the ink jet recording material of the present invention, the ink receiving layer preferably contains a cationic compound which contributes to fixing an anionic dye contained in the ink and to enhancing the water resistance and long term storage stability of the printed colored images.

Also, when the ultraviolet ray absorber comprises at least one member selected from organic ultraviolet ray-absorbing compounds, for example, benzotriazole compounds and inorganic ultraviolet ray-absorbing compounds, for example, zinc oxide, titanium dioxide, yttrium oxide and cerium oxide, the resultant ink receiving layer exhibit a significantly enhanced light resistance of colored images recorded thereon. Also, the above-mentioned ultraviolet ray absorbing compounds have a relatively good compatibility with the amorphous silica and alumina silicate particles. Therefore, a coating liquid containing the above-mentioned ultraviolet ray-absorbing compounds can be easily coated on a support to form an ink receiving layer.

In the ink jet recording material of the present invention, the ultraviolet ray absorber is preferably in the form of fine particles having an average particle size of, for example, 500 nm or less. The ultraviolet ray absorber may be pulverized together with the silica and/or alumina silicate. When the ultraviolet ray absorber particles having the above-mentioned particle size are used, the resultant ink receiving layer can exhibit a high gloss, color density, water resistance and light resistance of the recorded colored images, without decreasing the transparency of the ink receiving layer.

DESCRIPTION OF THE PREFERRED EMBODIMENTS

In the ink jet recording material of the present invention, the support is not limited to specific materials and thus may be formed from a transparent material or an opaque material. For example, the substrate preferably comprises a regenerated cellulose film, a plastic film, for example, polyethylene, polypropylene, soft polyvinyl chloride, hard polyvinyl chloride, or polyester film; a paper sheet, for example, a wood-free paper, a coated paper, an art paper, a cast-coated paper, a foil-laminated paper, a kraft paper, a polyethylene film-laminated paper, a resin-impregnated paper, a metalized paper or a water-soluble paper sheet; a metal foil; or a synthetic paper sheet.

The ink jet recording material of the present invention has one or more ink receiving layers formed on the support, and at least one of the ink receiving layers comprises:

(1) fine colloid pigment particles selected from fine colloid amorphous silica secondary particles and fine colloid alumina silicate secondary particles having an average secondary particle size of 10 to 300 nm and each consisting essentially of a plurality of primary particles having an average primary particle size of 3 to 40 nm and agglomerated with each other; and (2) an ultraviolet ray absorber.

In the present invention, when the fine colloid pigment secondary particles have an average secondary particle size of 10 to 500 nm, the resultant ink receiving layer has a higher gloss than that of a conventional ink receiving layer containing pigment particles with a particle size in the order of $\mu$m.

The ultrafine colloid amorphous silica and alumina silicate recording particles have a secondary particle size of 10 to 300 nm preferably 20 to 200 nm, and each consist essentially of a plurality of primary particles agglomerated with each other and having an average primary particle size of 3 to 40 nm, preferably 5 to 30 nm. When the primary particle size is too small, the resultant ink receiving layer exhibits an unsatisfactory ink absorbing property. Also, when the primary particle size is too large, the resultant ink receiving layer exhibits an unsatisfactory transparency and the printed colored images have an unsatisfactory color density. When the secondary particle size is too small, the resultant ink receiving layer exhibits a poor film-forming property and thus numerous cracks may be formed in the ink receiving layer. Also, when the secondary particles size is too large, the resultant ink receiving layer has a roughened surface and it becomes difficult to obtain a high gloss on the ink jet recording material. To obtain the secondary particles having an average secondary particle size of 10 to 300 nm or a dispersion thereof, conventional trade amorphous silica and/or alumina silicate pigment particles having a particle size of several micrometers are pulverized by applying a strong shearing force thereto by mechanical means, for example, a breaking-down method in which a material in the form of lumps is finely divided. The mechanical pulverizing means include ultrasonic homogenizers, pressure-type homogenizers, nanomizers, high speed revolution mills, roller mills, container-driven medium mills, medium-stirring mills, jet mills, mortars, and sand grinders. The resultant ultrafine particles may be in the form of colloid particles or a slurry. In the present invention, the average particle size is a particle diameter (Martin size) determined by using an electron microscope (SEM or TEM) (Asakura Shoten, "Fine Particle Handbook" page 52).

The fine alumina silicate particles are fine composite particles prepared by a hydrolysis synthetic method from, as principal components, of aluminum alkoxide and silicon alkoxide and contain alumina ($Al_2O_3$) segments and silica ($SiO_2$) segments which cannot be isolated from each other. The weight ratio of the alumina segments to the silica segments is usually about 6:2. Since the alumina silicate particles have an amorphous structure, the amorphous alumina silicate particles can be prepared even in the segment weight ratio in the range from 1:4 to 4:1 and can be utilized in the present invention.

Also, a three component metal alkoxide mixture is prepared from aluminum alkoxide, silicon alkoxide and an other metal alkoxide, and is subjected to a hydrolysis to prepare fine alumina silicate particles containing the other metal component.

The alumina silicate can be synthesized in an alcohol atmosphere and after the synthesis is completed, the alumina silicate is in the form of agglomerated particles (secondary particles). To obtain the alumina silicate secondary particles having an average secondary particle size of 10 to 300 nm, the agglomerated particles are pulverized into smaller particles by, for example, the above-mentioned method.

The ink receiving layer of the present invention optionally comprises, in addition to the ultrafine amorphous silica and/or alumina silicate particles, other trade pigments to enhance the ink-absorbing property of the ink receiving layer, unless the smoothness and transparency of the ink receiving layer are affected.

The additional pigment includes, inorganic pigments, for example, silica and alumina silicate different from the specific ultrafine amorphous silica and alumina silicate particles for the present invention, kaolin, clay, calcined clay, zinc oxide, tin oxides, magnesium sulfate, aluminum oxide, aluminum hydroxide, pseudoboehmite, calcium carbonate, satin white, aluminum silicate, smectite, magnesium silicate, magnesium carbonate, magnesium oxide and diatomaceous earth; and organic pigments, for example, styrene polymer plastic pigments, urea-formaldehyde resin pigments and benzoguanamine-formaldehyde resin pigments, which are usually used for coated paper sheets. The additional pigment is preferably used in an amount of 20 parts by weight or less per 100 parts by weight of the ultrafine amorphous silica and/or alumina silicate particles and has a particle size of 2 $\mu$m or less.

The ultraviolet ray absorber usable for the present invention preferably comprise at least one member selected from organic and inorganic ultraviolet ray-absorbing compounds as shown below.

The ultraviolet ray-absorbing organic compounds include ultraviolet ray-absorbing salicylate compounds, for example, phenyl salicylate, p-tert-butyl-phenyl salicylate and p-octylphenyl salicylate; ultraviolet ray-absorbing benzophenone compounds, for example, 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, and 2-hydroxy-4-methoxy-5-sulfobenzophenone; ultraviolet ray-absorbing benzotriazole compounds, for example, 2-(2'-hydroxy-5'-methylphenyl) benzotriazole, 2-(2'-hydroxy-5'-tert-butylphenyl) benzotriazole, 2-(2'-hydroxy-3'-tert-butyl-5'-methylphenyl)-5-chlorobenzotriazole, 2-(2'-hydroxy-3',5'-di-tert-butylphenyl)benzotriazole, 2-(2'-hydroxy-3',5'-di-tert-amylphenyl)benzotriazole, 2-[2'-hydroxy-3'-(3",4",5",6"-tetra-hydrophthalimidomethyl)-5'-methylphenyl] benzotriazole, and 2,2-methylene-bis[4-(1,1,3,3-tetramethylbutyl)-6-(2H-benzotriazole-2-yl)phenol; and ultraviolet ray-absorbing cyanoacrylate compounds, for example, 2-ethylhexyl-2-cyano-3,3'-diphenyl acrylate and ethyl-2-cyano-3,3'-diphenyl acrylate. Among the above-mentioned compounds, the ultraviolet ray-absorbing benzotriazole compounds are advantageously employed for the present invention, because they have a good compatibility to the other components for the ink receiving layer and cause the colored images printed on the resultant ink receiving layer to exhibit an excellent light resistance.

The ultraviolet ray-absorbing compounds include oxides of transition metals, for example, cerium oxide, zinc oxide, titanium oxide and yttrium oxide. Also, cerium acetate is usable as an ultraviolet ray-absorbing transition metal compound.

As mentioned above, among the organic ultraviolet ray-absorbing compounds as mentioned above, the ultraviolet ray-absorbing benzotriazole compounds are preferably used. Also, to obtain an ink receiving layer having an enhanced water resistance, the transition metal oxides are prepared as the ultraviolet ray absorber. Particularly, cerium oxides exhibit an excellent ultraviolet ray absorption, and can be obtained in the form of fine particles having a particle size of 20 nm or less, particularly 10 nm or less, and thus an excellent transparency. Also, cerium oxides include cationic oxides. Therefore, cerium oxides are advantageously used for the present invention.

A trade cerium oxide is available under a trademark of Needral, made by TAKI CHEMICAL CO., LTD. and has a particle size of 8 nm or less. A trade cationic cerium oxide is available under a trademark of U-15, made from TAKI CHEMICAL CO., LTD.

The above-mentioned organic and inorganic ultraviolet ray-absorbing compounds may be used alone or in a mixture of two or more thereof, for the present invention.

Where the ultraviolet ray absorber is in the state of a liquid, the liquid ultraviolet ray absorber per se can be mixed into a coating liquid for the ink receiving layer. For example, 2-hydroxy-4-methoxy-benzophenone (available under the trademark of SEESORB 101, made by SHIRAISHI CALCIUM CO.) is soluble in water, and 2-(2'-hydroxy-5'-methylphenyl)benzotriazole (available under trademark of JF-77, made by JOHOKU CHEMICAL CO., LTD. or of SEESORB 701, made by SHIRAISHI CALCIUM CO., LTD.) is soluble in water at a high pH value. Of the inorganic ultraviolet ray absorbers, cerium acetate is soluble in water. Other ultraviolet ray absorbing compounds are mostly insoluble in water. When is insoluble in water, the ultraviolet ray absorber particles in the form of a powder or suspension (emulsion) is preferably controlled to an average particle size of 500 nm or less not to affect the transparency and smoothness of the ink receiving layer. There is no specific lower limit to the average particle size of the ultraviolet ray absorber. Usually, the average particle size can be decreased to about 1 nm. To control the average particle size of the ultraviolet ray absorber particles to 500 nm or less, the above-mentioned pulverizing method, for example, the breaking-down method, can be utilized.

There is no specific limitation to the content of the ultraviolet ray absorber in the ink receiving layer. Preferably, the ultraviolet ray absorber is contained in an amount of about 0.5 to about 25 parts by weight per 100 parts of the total amount of the pigment. When the content of the ultraviolet ray absorber is too small, the resultant light resistance is unsatisfactory and when it is too large, the resultant light resistance-enhancing effect is saturated.

The ultraviolet ray absorber particles may be in the form of agglomerated particles which contribute to enhancing the ink absorbing property of the ink receiving layer. The secondary particle size of the fine ultraviolet ray absorber can be selected within the range of 2 μm or less. However, to further enhance the ink absorbing property of the ink receiving layer and the color density of the printed images, the secondary particle size of the fine ultraviolet ray absorber is preferably in the range from 0.1 μm to 1 μm, more preferably 150 nm to 500 nm. When the particle size of the secondary particles is too small, the resultant ink-receiving layer may exhibit an unsatisfactory film-forming property and thus numerous cracks may be formed in the resultant ink receiving layer. On the other hand, when the particle size of the secondary particles of the ultraviolet ray absorber is too large, the resultant ink receiving layer may have a roughened surface and thus an ink jet recording material having a high gloss may not be obtained.

The primary particles which are agglomerated with each other to form secondary particles of the ultraviolet ray absorber preferably have an average primary particle size of 3 nm to 100 nm, more preferably 5 nm to 50 nm. When the primary particle size is too small, the resultant secondary particles of the ultraviolet ray absorber may exhibit an insufficient ink-absorbing property, and when it is too large, the resultant ink received layer may be disadvantageous in that the transparency of the ink receiving layer is insufficient, and the colored images printed on the resultant ink receiving layer are unsatisfactory in color density thereof.

The mixing weight ratio of the fine secondary particles of the pigment to the secondary particles of the ultraviolet ray absorber is preferably within the range from 50/1 to 2/1, more preferably from 20/1 to 20/7. When the proportion of the fine pigment particle is too high, the light resistance-enhancing effect on the ink receiving layer may be insufficient and when it is too low, the color brightness of the resultant colored images may be unsatisfactory and the resultant ink receiving layer may exhibit an unsatisfactory transparency. The secondary particles of the ultraviolet ray absorber having an average particle size of 2 μm or less can be prepared by pulverizing trade ultraviolet ray absorber agglomerated particles (having, for example, a particle size of several micrometers) and by mechanical means in which a strong shearing force is applied to the particles. Namely, the afore-mentioned breaking-down method which is useful for finely dividing a lump-formed material may be applied. The mechanical means include the above-mentioned ultrasonic homogenizers, pressure-type homogenizers, nanomizers, high speed revolution mills, roller mills, container-drived medium mill, medium-stirring mills, jet mills, and sand grinders. The resultant ultrafine ultraviolet ray absorber particles may be in the state of a colloidal solution or a slurry.

In a preferred embodiment of the present invention, to further enhance the light resistance, the ink receiving layer further contains an antioxidant. There is no specific limitation to the content of the antioxidant in the ink receiving layer. Usually, the antioxidant is preferably used in an amount of 1 to 10,000 parts, preferably 1 to 1000 parts, more preferably 10 to 500 parts by weight per 100 parts by weight of the ultraviolet ray absorber.

Namely, in an embodiment of the ink jet recording material of the present invention, one or more ink receiving layers are formed on a support and at least one layer of the ink receiving layers comprises fine colloid pigment particles selected from amorphous silica secondary particles and alumina silicate secondary particles having an average secondary particle size of 10 to 300 nm and consisting essentially of a plurality of primary particles having an average primary particle size of 3 to 40 nm and agglomerated with each other, an ultraviolet ray absorber and an antioxidant.

The antioxidant usable for the present invention comprises at least one member selected from, for example, phenolic antioxidant compounds, sulfur-containing antioxidant compounds and phosphorus-containing antioxidant compounds.

The phenolic antioxidant compounds include monophenolic antioxidant compounds, for example, 2,6-di-tert-butyl-p-cresol, butylated hydroxy anisole, 2,6-di-tert-butyl-4-ethylphenol and stearyl-β-(3,5-di-tert-butyl-4-hydroxyphenyl)propionate; bisphenolic antioxidant compounds, for example, 2,2'-methylene-bis(4-metyl-6-tert-butylphenol), 2,2'-methylene-bis(4-ethyl-6-tert-butylphenol), 4,4'-thiobis(3-methyl-6-tert-butylphenol) and 4,4'-butylidenebis(3-methyl-6-tert-butylphenol); and polyphenolic antioxidant compounds, for example, 1,1,3-tris(2-methyl-4-hydroxy-5-tert-butylphenol)butane, 1,1,3-tris(2-methyl-4-hydroxy-5-cyclophexyl-phenyl)butane, 1,3,5-trimethyl-2,4,6-tris(3,5-di-tert-butyl-4-hydroxy-benzyl) benzene, tetrakis[methylene-3-(3',5'-di-tert-butyl-4'-hydroxyphenyl)propionate]methane, bis[3,3'-bis-(4'-hydroxy-3'-tert-butylphenyl)butylic acid]glycol ester, 1,3,5-tris(3',5'-di-tert-butyl-4'-hydroxybenzyl)-S-triazine-2,4,6-(1H,3H,5H)trione and tocopherols.

The sulfur-containing antioxidant compounds include, for example, dilauryl 3,3'-thiodipropionate, dimyristyl 3,3'-thiodipropionate and distearyl 3,3'-thiodipropionate.

The phosphorus-containing antioxidant compounds include, for example, triphenyl phosphite, diphenylisodecyl phosphite, phenyldiisodecyl phosphite, 4,4'-butylidene-bis (3-methyl-6-tert-butylphenylditridecyl)phosphite, cyclic neopentane tetraylbis (octadecyl phosphite), tris (nonylphenyl)phosphite, tris(mononony lphenyl)phosphite, tris(dinonylphenyl)phosphite, diisodecylpentaeryhritol diphosphite, 9,10-dihydro-9-oxa-10-phosphaphenanthrene=10-oxide, 10-(3,5-di-tert-butyl-4-hydroxy-benzyl)-9,10-dihydro-9-oxa-10-phosphaphenanthrene-10-oxide, 10-decyloxy-9,10-dihydro-9-oxa-10-phosphaphenanthrene, tris(2,4-di-tert-butylphenyl)phosphite, cyclic neopentanetetrayl-bis(2,4-di-tert-butylphenyl)phosphite, cyclic neopentanetetrayl-bis(2,6-di-tert-bytyl-4-methylphenyl)phosphite, and 2,2-methylene-bis(4,6-di-tert-butylpheyl)octyl phosphite.

In the ink jet recording material of the present invention, in consideration of the compatibility with the coating liquid for the ink receiving layer and the light resistance of the cohered images recorded in the ink receiving layer, the phonolic compounds are preferred for the antioxidant. Particularly, 2,2'-methylene-bis(4-ethyl-6-tert-butylphenol) which is available, for example, under the trademark of ANTAGE W-500, made by KAWAGUCHI CHEMICAL CO., 4,4'-thio-bis(3-methyl-6-tert-butylphenol which is available, for example, under the trademark of SUMIRIZER WX, made by SUMITOMO CHEMICAL CO., LTD., 1,1,3-tris(2-methyl-4-hydroxy-5-tert-butylphenyl)butane which is available, for example, under the trademark of ADECASTAB AO-30, made by ASAHI DENKA KOGYO K. K., and 1,1,3-tris(2-methyl-4-hydroxy-5-cyclohexylphenyl) butane which is available, for example, under the trademark of ARKLS DH-43, made by ASAHI DENKA KOGYO K. K.

Where the antioxidant for the present invention is in the state of a solution, the solution per se can be added to the coating liquid for the ink receiving layer.

Where the antioxidant for the present invention is in the form of a water-insoluble powder or a suspension (emulsion), the average particle size of the antioxidant particles is preferably controlled to a level of 500 nm or less. To control the average particle size to 500 nm or less, the afore-mentioned mechanical means, for example, a breaking down method, are utilized. There is no specific limitation to the content of the antioxidant in the ink receiving layer. Usually, the content of the antioxidant is preferably 0.5 to 25 parts by weight per 100 parts by weight of the pigment. When the antioxidant content is too low, the light resistance-enhancing effect may be unsatisfactory. Also when the antioxidant content is more than 25 parts by weight, the light resistance-enhancing effect may be saturated, and thus an economical disadvantage may occur.

In the preparation of the ink receiving layer, the ultrafine amorphous silica and/or alumina silicate particles, the ultraviolet ray absorber and optionally the antioxidant which have no film-forming property, are mixed with a binder. The binder preferably comprises at least one member selected from water-soluble polymers, for example, polyvinyl alcohol (PVA), and derivatives thereof such as silyl-modified polyvinyl alcohols and cation-modified polyvinyl alcohols, casein, soybean protein, synthetic proteins, starch, and cellulosic compounds, for example carboxymethyl cellulose and methylcelluloce; and dispersions or latices of water-insoluble polymers, for example, latices of conjugated diene polymers, for example, styrene-butadiene copolymers and methyl-methacrylate-butadiene copolymers, latices of acrylic polymers, and latices of vinyl copolymers, for example, styrene-vinyl acetate copolymers, which are usually employed for coated paper sheets. These polymeric compounds are used alone or in a mixture of two or more thereof. To obtain a high bonding strength between the ink receiving layer and the support or between the ink receiving layers, the water-soluble binder is preferably used. Particularly, when a PVA having a polymerization degree of 2,000 or more is used as a binder, the adhesion between the ink receiving layer and the support or between the ink receiving layers is high, and thus is useful for obtaining an ink jet recording material having a high ink-absorbing rate, a high ink absorption capacity, a high color density of colored images, a high water resistance and a high light resistance.

There is no specific upper limit of the polymerization degree of the PVA.

Usually, the PVA having a polymerization, degree of about 10,000 or less can be used for the present invention, unless the PVA causes the resultant coating liquid to exhibit too high a viscosity.

Preferably, in the ink receiving layer of the present invention, the binder is contained in an amount of 2 to 200 parts, more preferably 5 to 100 parts, by solid weight per 100 parts by weight of the pigment. When the content of the binder in the ink receiving layer is too high, pores formed between the solid particles may become too small and thus the ink-absorbing rate of the resultant ink receiving layer may be insufficient. When the binder content is too small, the resultant ink receiving layer may have large cracks formed due to a poor film-forming property and may exhibit reduced gloss and color density of printed images.

For the purpose of enhancing the ink-fixing property of the ink receiving layer, a cationic compound may be contained in the ink receiving layer. When the ink receiving layer has a single layered structure, the single ink receiving layer preferably contains the cationic compound. Also, when the ink receiving layer has a multiple layered structure, the outermost ink receiving layer on which the ink jet printing is applied preferably contains the cationic compound.

The cationic compounds usable for the present invention are preferably selected from cationic polymers. The cationic polymers include polyalkylenepolyamines, for example, polyethyleneamines and polypropylenepolyamines and derivatives thereof, acrylic polymers having tertiary amino groups and/or quaternary ammonium groups, and diacrylamines.

There is no limitation to the amount of the cationic compound in the ink receiving layer. Usually, the cationic compound is preferably used in an amount of 1 to 30 parts by weight, more preferably 5 to 20 parts by weight, per 100 parts by weight of the pigment.

The ink receiving layer of the present invention optionally further contains at least one additive selected from dispersing agents, thickening agents, defoaming agents, coloring agents, antistatic agents and preservatives which are usually used for coated paper sheets.

In a preferred embodiment of the present invention, to enhance the water resistance and the light resistance of the ink images formed on the ink receiving layer, the cationic compound is preferably selected from the group consisting of polymers of diallyldimethyl ammonium chloride, copolymers of diallyldimethyl ammonium chloride with sulfur dioxide and copolymers of at least one amine with at least one carboxylic acid (for example, a copolymer of diallyl amine with maleic acid). By using the above-mentioned types of cationic polymers, the light resistance of the printed ink images can be significantly enhanced, substantially without degrading the color-forming property of the ink and the water resistance.

The reasons of the specific effects of the above-mentioned cationic polymers are not clear at the present time. However, it is assumed that the reactivity and stability of the basic segments of the cationic polymers contribute to the above-mentioned specific effects. The above-mentioned cationic polymers preferably have a molecular weight (MW) of 50,000 or more, more preferably 100,000 to 400,000. When the molecular weight is too low, the resultant cationic polymer may penetrate between the primary particles of the solid components and may cause a reduction in the ink-absorbing property of the resultant ink receiving layer. Also, when the molecular weight is too high, the cationic polymer causes the resultant coating liquid for the ink receiving layer to exhibit too high a viscosity and to be difficult to coat. The above-mentioned types of cationic polymers are preferably contained in an amount of 1 to 30 parts by weight, more preferably 5 to 20 parts by weight, per 100 parts by weight of the pigment, in the ink receiving layer. When the amount of the cationic polymer is too low, the resultant ink images may exhibit an unsatisfactory water resistance-enhancing effect. Also, the amount of the cationic polymer is too high, the resultant ink receiving layer may exhibit unsatisfactory ink-absorbing rate and ink absorption capacity.

To further enhance the water resistance, trade cationic resins other than the above-mentioned cationic polymers may be blended therewith. The cationic resins include polyalkylene-polyamines, for example, polyethyleneamine and polypropylenepolyamine, and the derivatives thereof; acrylic resins having tertiary amino groups and quaternary ammonium groups; diacrylamines; and other conventional cationic resins.

The ink receiving layer of the present invention may consist of the specific ink receiving layer as mentioned above alone. However, to further enhance the ink-absorbing property, the ink receiving layer preferably comprises one or more additional ink receiving layer in addition to the specific ink receiving layer which will be referred to as a principal ink receiving layer hereinafter. When two or more ink receiving layers are formed on the support, at least one of them is the principal ink receiving layer comprising the specific fine colloid pigment particles and the ultraviolet ray absorber, and preferably is arranged to form an outermost layer to which the ink jet printing is applied.

The additional ink receiving layer comprises a pigment which may comprise at least one member selected from the above-mentioned specific amorphous silica and/or alumina silicate and/or other trade pigments. Also, the additional ink receiving layer may contain the cationic compound.

There is no limitation to the amount of the ink receiving layer. When the ink receiving layer consists of a single principal ink receiving layer, usually the ink receiving layer is preferably formed in an amount of 3 to 60 $g/m^2$, more preferably 10 to 50 $g/m^2$. When the ink receiving layer has a multiple layered structure, the principal ink receiving layer containing the ultraviolet ray absorber and preferably arranged to form an outermost layer is preferably formed in an amount of 1 to 30 $g/m^2$, more preferably 3 to 20 $g/m^2$. When the amount of the principal ink receiving layer is too low, the light resistance effect of the resultant ink jet recording material may be unsatisfactory. Also, when the principal ink receiving layer amount is too high, the light resistance effect may be saturated.

The additional ink receiving layer which may contain no ultraviolet ray absorber is preferably formed in a weight of 1 to 50 $g/m^2$, more preferably 5 to 40 $g/m^2$.

In the production of the ink jet recording material of the present invention, preferably, at least one coating layer corresponding to the outermost ink receiving layer is formed on a casting surface; the resultant cast-coated layer is transferred and bonded to a surface of the support or to a surface of at least one additional ink receiving layer directly formed on the support; and then the casting surface is removed from the transferred cast-coated layer to form an outermost ink receiving layer. The resultant outermost ink receiving layer exhibits an excellent gloss.

The casting surface has a high smoothness and is formed by a high smoothness surface of a flexible sheet or film, for example, a plastic resin film such as regenerated cellulose film, polyethylene film, polypropylene film, soft polyvinyl chloride film, hard polyvinyl chloride film or polyester film; a paper sheet, for example, a polyethylene layer-laminated paper sheet, a glossive paper sheet, an impregnated paper sheet, or metallized paper sheet; a metal foil; or a synthetic paper sheet; or a high smoothness surface of a glass, metal or plastic drum or plate. In consideration of production process and releasing aptitude of the resultant ink receiving layer from the casting surface, the polymer film, for example, polyethylene, polypropylene or polyester film, and the metallic drum having a high smoothness surface are preferably employed.

To impart a high gloss to the ink receiving layer, the casting surface preferably has a high smoothness. For this purpose, the casting surface preferably has a surface roughness Ra (in accordance with Japanese Industrial Standard (JIS) B-0601) of 0.5 $\mu$m or less, more preferably 0.05 $\mu$m or less. However, the casting surface may be a semi-gloss surface or a mat surface formed by controlling the surface roughness.

The casting surface may be a non-coated surface. To arrange that the adhesive force between the ink-receiving layer and the substrate or another ink receiving layer is higher than that between the casting surface and the ink receiving layer formed on the casting surface, the casting surface may be coated with a releasing compound, for example, a silicone compound or a fluorine-containing resin.

There is no limitation to the bonding method between the cast-coated layer formed on the casting surface and the support or the additional ink receiving layer directly formed on the support, as long as they can be firmly bonded. Usually, the bonding can be carried out only by applying a pressure, for example, 5 to 150 kg/cm and by heating, for example, to a temperature of 30 to 100° C. However, preferably, a water vapor or water is applied to the cast-coated layer on the casting surface and/or to the surface of the support or the additional ink receiving layer to an extent such that the water vapor or water-applied layers have a moisture content of 50 to 350% based on the bone dry weight of the layers, and the water vapor or water-applied layers are brought into contact with each other and pressed by, for example, a calender. Also, the support may be coated with an intermediate bonding or adhesive layer. The adhesive layer may be pressure-sensitive. More advantageously, the intermediate layer is utilized as an additional ink receiving layer. Namely, the support is coated with the additional ink receiving layer and brought, in wetted condition, into contact with the cast-coated layer, to bond them with each other, and then the bonded layers are dried.

The ink receiving layers and the intermediate layer of the present invention can be formed by using a conventional coating device, for example, die coater blade coater, air knife coater, roll coater, bar coater, gravure coater, rod blade coater, lip coater or curtain coater.

The ink applicable to the ink jet recording material of the present invention comprises, as indispensable components, a coloring material for forming colored images and a liquid medium for dissolving or dispersing the coloring material and, as an optional component, an additive comprising at least one member selected from dispersing agents, surfactants, viscosity-modifiers, specific resistance modifiers, pH-modified, mildewproofing agents, and dissolution or dispersion-stabilizers for the coloring materials.

The coloring material for the ink is not limited to specific dyes or pigments and can be selected from conventional direct dyes, acid dyes, basic dyes, reactive dyes, food dyes, disperse dyes, oil dyes and coloring pigments. The content of the coloring material in the ink is variable depending on the type of the liquid medium and the derived properties for the ink. In the ink applicable to the ink jet recording material of the present invention, the content of the coloring material is preferably 0.1 to 2% by weight which is similar to that of conventional inks.

The liquid medium of the ink applicable to the ink jet recording material of the present invention preferably comprises at least one member selected from water, and water-soluble organic solvents, for example, alkyl alcohols having 1 to 4 carbon atoms, for example, methyl alcohols, ethyl alcohol, n-propyl alcohol, isopropyl alcohol, n-butyl alcohol and isobutyl alcohol; ketones, for example, acetone; ketone alcohols, for example, diacetone alcohol; polyalkylene glycols, for example, polyethylene glycol and polypropylene glycol; alkylene glycols having 2 to 6 alkylene groups, for example, ethylene glycol, propylene glycol, butylene glycol, triethylene glycol, thio-diglycol, hexylene glycol and diethylene glycol; amides, for example, dimethylformamides; ethers, for example, tetrahydrofuran; and lower alkylethers of polyhydric alcohols, for example, glycerol, ethyleneglycolmethyl ether, diethyleneglycol methyl (or ethyl) ether, triethyleneglycol monomethylether.

EXAMPLES

The present invention will be further explained by the following examples which are merely representative and do not restrict the scope of the present invention in any way.

In the examples and comparative examples the term "part" and "%" are—part by dry solid weight—and—% by dry solid weight, respectively, unless specifically shown otherwise.

Note: The primary particle size of the pigment particles does not change by pulverize-dispersing.

In Examples I-1 to I-11 and Comparative Examples I-1 to 7, the following pigment particle sols were prepared and employed.

(1) Preparation of pigment sols

Silica sol AI

Synthetic amorphous silica particles (trademark: NIPSIL HD-2, made by NIPPON SILICA INDUSTRIAL CO., LTD.) having an average secondary particle size of 3 $\mu$m and an average primary particle size of 11 nm were pulverize-dispersed by a sand grinder and then further pulverize-dispersed by a pressure-type homogenizer. The pulverize-dispersing procedures by the sand grinder and the pressure-type homogenizer were alternately repeated until the average secondary particle size of the amorphous silica particles reached 60 nm, to prepare an amorphous silica sol AI having a dry solid content of 7%.

Silica sol BI

Synthetic amorphous silica particles (trademark: NIPSIL LP, made by NIPPON SILICA INDUSTRIAL CO., LTD.) having an average secondary particle size of 3 $\mu$m and an average primary particle size of 16 nm were pulverize-dispersed by a sand grinder and then further pulverize-dispersed by a pressure-type homogenizer. The pulverize-dispersing procedures by the sand grinder and the pressure-type homogenizer were alternately repeated until the average secondary particle size of the amorphous silica particles reached 100 nm, to prepare an amorphous silica sol BI having a dry solid content of 9%.

Silica sol CI

Synthetic amorphous silica particles (trademark: NIPSIL E-1011, made by NIPPON SILICA INDUSTRIAL CO., LTD.) having an average secondary particle size of 1.5 μm and an average primary particle size of 24 nm were pulverize-dispersed by a sand grinder and then further pulverize-dispersed by a pressure-type homogenizer. The pulverize-dispersing procedures by the sand grinder and the pressure-type homogenizer were alternately repeated until the average secondary particle size of the amorphous silica particles reached 200 nm, to prepare an amorphous silica sol CI having a dry solid content of 12%.

Silica sol DI

Synthetic amorphous silica particles (trademark: NIPSIL E-1011, made by NIPPON SILICA INDUSTRIAL CO., LTD.) having an average secondary particle size of 1.5 μm and an average primary particle size of 24 nm were pulverize-dispersed by a sand grinder and then further pulverize-dispersed by a pressure-type homogenizer. The pulverize-dispersing procedures by the sand grinder and the pressure-type homogenizer were alternately repeated until the average secondary particle size of the amorphous silica particles reached 350 nm, to prepare an amorphous silica sol DI having a dry solid content of 12%.

Alumina silicate sol I

Isopropyl alcohol in an amount of 10 g was placed in a glass reactor having a capacity of 2 liters and equipped with a stirrer, having a diameter of 3 cm and comprising three stirring rings, and a thermometer, and heated to a liquid temperature of 60° C. by using an oil bath heater. While the stirrer was rotated at a rotation speed of 100 rpm to agitate the liquid in the reactor, 5 g of aluminum isopropoxide (made by WAKO PURE CHEMICAL INDUSTRIES, LTD.) were added, and then 1 g of an acid catalyst consisting of acetic acid (made by WAKO PURE CHEMICAL INDUSTRIES, LTD.) was further added to the isopropyl alcohol. The reaction mixture was refluxed, while maintaining the refluxing temperature constant, for 24 hours.

Separately, in a glass reactor was charged 100 g of ion-exchanged water and the charge was heated to a temperature 60° C., and 1.8 g ethyl orthosilicate (made by WAKO PURE CHEMICAL INDUSTRIES, LTD.) was added and then 1 g of an acid catalyst consisting of nitric acid (made by WAKO PURE CHEMICAL INDUSTRIES, LTD.) was added to the ion-exchanged water. The mixture was refluxed for 24 hours while maintaining the refluxing temperature constant.

The ethyl orthosilicate-nitric acid-ion-exchanged water solution was mixed with the aluminum isopropoxide-acetic acid-ispropyl alcohol solution, and the mixture was stirred and heated at a temperature of 60° C. for 6 hours to prepare fine particles of alumina silicate. Then, the reaction mixture was concentrated by evaporation at a temperature of 60° C., to provide agglomerated particles of alumina silicate. In the resultant particles, the composition molar ratio of alumina to silica was 3:2. The agglomerated particles were mixed with water and subjected to repeated pulverizing and dispersing procedures with a sand grinder and then with a pressure-type homogenizer until the average secondary particles size reached 100 nm, to provide a 10% aqueous alumina silicate sol I.

In the alumina silicate sol I, the alumina silicate particles had an average primary particle size of 10 nm.

Example I-1

A 7% aqueous coating liquid was prepared by mixing 100 parts of the silica sol AI with 3 parts of an ultraviolet ray absorber consisting of 2-(2'-hydroxy-5'-methylphenyl) benzotriazole (trademark: SEESORB 701, made by SHIRAISHI CALCIUM CO.) and 35 parts of polyvinyl alcohol (trademark: PVA-135H, made by KURARAY CO., LTD.) having a polymerization degree of 3500 and a saponification degree of 99% or more.

A surface of a trade coated paper sheet (trademark: OK COAT, made by OJI PAPER CO., LTD.) having a basis weight of 127.9 g/m$^2$ was coated with the aqueous coating liquid and dried to form an ink receiving layer with a dry weight of 20 g/m$^2$.

An ink jet recording material of the present invention was obtained.

Example I-2

An 8% aqueous coating liquid was prepared by mixing 100 parts of the silica sol AI with 15 parts of a cationic resin consisting of a copolymer of diallyldimethyl ammonium chloride with acrylamide (trademark: PAS-J-81, made by NITTO BOSEKI CO., LTD.); coagulating and thickening the mixture; pulverize-dispersing the mixture by a pressure-type homogenizer to an extent such that the average particle size of the mixture reached 100 nm; and then mixing the resultant cationic resin-containing silica sol with 3 parts of an ultraviolet ray absorber consisting of 2-(2'-hydroxy-5'-methylphenyl)benzotriazole (trademark: SEESORB 701, made by SHIRAISHI CALCIUM CO.) and 20 parts of polyvinyl alcohol (trademark: PVA-135H, made by KURARAY CO., LTD.) having a polymerization degree of 3500 and a saponification degree of 99% or more.

A surface of a trade coated paper sheet (trademark: OK COAT, made by OJI PAPER CO., LTD.) having a basis weight of 127.9 g/m$^2$ was coated with the aqueous coating liquid and dried to form an ink receiving layer having a dry weight of 20 g/m$^2$.

An ink jet recording material of the present invention was obtained.

Example I-3

An ink jet recording material of the present invention was produced by the same procedures as in Example I-2, except that as an ultraviolet ray absorber, 2-[2'-hydroxy-3'-(3",4",5",6"-tetrahydrophthalimidomethyl)-5'-methylphenyl] benzotriazole (trademark: SEESORB 706, made by SHIRAISHI CALCIUM CO.) was employed.

Example I-4

An ink jet recording material of the present invention was produced by the same procedures as in Example I-2, except that as an ultraviolet ray absorber, 2-hydroxy-4-octoxybenzophenone (trademark: SEESORB 102, made by SHIRAISHI CALCIUM CO.) was employed.

Example I-5

An ink jet recording material of the present invention was produced by the same procedures as in Example I-2, except that as an ultraviolet ray absorber, p-octylphenylsalicylate (trademark: OPS, made by YASHIRO SEIYAKU K. K.) was employed.

Example I-6

An ink jet recording material of the present invention was produced by the same procedures as in Example I-2, except that the silica sol AI was replaced by the silica sol BI.

Example I-7

An ink jet recording material of the present invention was produced by the same procedures as in Example I-2, except that the silica sol AI was replaced by the silica sol CI.

Example I-8

An ink jet recording material of the present invention was produced by the same procedures as in Example I-2, except that the silica sol AI was replaced by the alumina silica sol I.

Example I-9

An 8% aqueous coating liquid was prepared by mixing 100 parts of the silica sol AI with 15 parts of titanium dioxide (trademark: ST-440, made by TITAN KOGYO K. K.) having a particle size of 30 to 50 nm, as an ultraviolet ray absorber, 15 parts of a cationic resin consisting of a copolymer of diallyldimethyl ammonium chloride with acrylamide (trademark: PAS-J-81, made by NITTO BOSEKI CO., LTD.); coagulating and thickening the mixture; pulverize-dispersing the mixture by a pressure-type homogenizer to an extent such that the average particle size of the mixture reached 150 nm; and then mixing the resultant sol 20 parts of the same polyvinyl alcohol as mentioned in Example I-1.

A surface of the same trade coated paper sheet as in Example I-1 was coated with the aqueous coating liquid and dried to form an ink receiving layer having a dry weight of 20 $g/m^2$.

An ink jet recording material of the present invention was obtained.

Example I-10

An 8% aqueous coating liquid was prepared by mixing 100 parts of the silica sol AI with 15 parts of a cationic resin consisting of a copolymer of diallyldimethyl ammonium chloride with acrylamide (trademark: PAS-J-81, made by NITTO BOSEKI CO., LTD.); coagulating and thickening the mixture; pulverize-dispersing the mixture by a pressure-type homogenizer to an extent such that the average particle size of the mixture reached 100 nm; and then mixing the resultant cationic resin-containing silica sol with 10 parts of an ultraviolet ray absorber consisting of cerium oxide having a particle size of 8 nm (trademark: NEEDRAL U-15, made by TAKI CHEMICAL CO., LTD.) and 20 parts of the same polyvinyl alcohol as an Example I-1.

A surface of the same trade coated paper sheet as in Example I-1 was coated with the aqueous coating liquid and dried to form an ink receiving layer having a dry weight of 20 $g/m^2$.

An ink jet recording material of the present invention was obtained.

Example I-11

The same aqueous coating liquid as in Example I-2 was coated on a surface of a casting film consisting of a PET film having a thickness of 50 $\mu$m (trademark: LUMILER T, made by TORAY INDUSTRIES INC.) and dried to form a cast-coated layer corresponding to an outermost ink receiving layer and having a dry weight of 15 $g/m^2$.

A 10% aqueous coating liquid for an additional ink receiving layer was prepared by mixing 100 parts of the silica sol CI with 25 parts of the same polyvinyl alcohol as in Example I-1. The resultant coating liquid was coated on a surface of a trade woodfree paper sheet having a basis weight of 127.9 $g/m^2$ to form an additional ink receiving layer having a weight corresponding to a dry weight of 10 $g/m^2$.

The additional ink receiving layer on the support sheet was superposed on and bonded to the cast-coated layer on the casting PET film, dried, and then the PET film was removed from the cast-coated layer.

An ink jet recording material of the present invention was obtained.

Comparative Example I-1

An aqueous coating liquid having a total solid content of 7% was prepared by mixing 100 parts of the silica sol AI with 35 parts of polyvinyl alcohol (trademark: PVA-135H, made by KURARAY CO., LTD.) having a polymerization degree of 3500 and a saponification degree of 99% or more.

The aqueous coating liquid was coated on a surface of a trade coated paper sheet (trademark: OK COAT, made by OJI PAPER CO., LTD.) having a basis weight of 127.9 $g/m^2$ and dried to form an ink receiving layer having a dry weight of 20 $g/m^2$.

A comparative ink jet recording material was obtained.

Comparative Example I-2

An aqueous coating liquid having a total solid content of 10% was prepared by mixing 100 parts of the silica sol DI with 3 parts of 2-(2'-hydroxy-5'-methylphenyl)benzotriazole (ultraviolet ray absorber, trademark: SEESORB-701, made by SHIRAISHI CALCIUM CO., LTD.) and 35 parts of polyvinyl alcohol (trademark: PVA-135H, made by KURARAY CO., LTD.) having a polymerization degree of 3500 and a saponification degree of 99% or more.

The aqueous coating liquid was coated on a surface of a trade coated paper sheet (trademark: OK COAT, made by OJI PAPER CO., LTD.) having a basis weight of 127.9 $g/m^2$ and dried to form an ink receiving layer having a dry weight of 20 $g/m^2$.

A comparative ink jet recording material was obtained.

Comparative Example I-3

An aqueous coating liquid having a total solid content of 10% was prepared by mixing 100 parts of amorphous silica (trademark: FINESIL 45, made by TOKUYAMA CORP.) having an average particle size of 4.5 $\mu$m with 30 parts of polyvinyl alcohol (trademark: R-1130, made by KURARAY CO., LTD.).

The aqueous coating liquid was coated on a surface of a trade coated paper sheet (trademark: OK COAT, made by OJI PAPER CO., LTD.) having a basis weight of 127.9 $g/m^2$ and dried to form an ink receiving layer having a dry weight of 20 $g/m^2$.

A comparative ink jet recording material was obtained.

Comparative Example I-4

An aqueous coating liquid having a total solid content of 10% was prepared by mixing 100 parts of amorphous silica (trademark: FINESIL 45, made by TOKUYAMA CORP.) having an average particle size of 4.5 $\mu$m with 3 parts of an ultraviolet ray absorber consisting of 2-[2'-hydroxy-5'-methylphenyl)benzotriazole (trademark: SEESORB-701, made by SHIRAISHI CALCIUM CO.) and 30 parts of polyvinyl alcohol (trademark: R-1130, made by KURARAY CO., LTD.).

The aqueous coating liquid was coated on a surface of a trade coated paper sheet (trademark: OK COAT, made by OJI PAPER CO., LTD.) having a basis weight of 127.9 $g/m^2$ and dried to form an ink receiving layer having a dry weight of 20 $g/m^2$.

A comparative ink jet recording material was obtained.

Comparative Example I-5

A trade mat-type ink jet recording paper sheet (trademark: MJA4SP1, made by EPSON CORP.) was subjected to the tests which will be illustrated later.

Comparative Example I-6

A trade gloss paper-type ink jet recording paper sheet (trademark: GP-101, made by CANON CORP.) was subjected to the tests which will be illustrated later.

Comparative Example I-7

A trade ink jet recording paper sheet (trademark: PHOTO JET PAPER-GLOSS SHEET KJPA4-GH20, made by KONIKA CO.) was subjected to the tests which will be illustrated later.

Example I-12

An ink jet recording material of the present invention was produced by the same procedures as in Example I-2, except that 3 parts of the ultraviolet ray-absorber (trademark: SEESORB 701, made by SHIRAISHI CALCIUM CO.) were replaced by 10 parts of the ultraviolet ray-absorbing sol prepared by the following procedures.

Preparation of ultraviolet ray-absorbing sol

A cerium oxide sol (trademark: W-10, made by TAKI CHEMICAL CO., LTD., anion) containing no agglomerated particles and having a primary particle size of about 5 nm and in an amount of 100 parts was mixed with 100 parts of a cerium oxide sol (trademark: NEEDRAL U-15, made by TAKI CHEMICAL CO., LTD., cation) containing no agglomerated particles and having a primary particle size of about 5 nm, to form a coagulation. The coagulation was pulverize-dispersed by a sand grinder, and further pulverize-dispersed with a pressure-type homogenizer. The pulverize-dispersing operation was repeated by alternately using the sand grinder and the pressure-type homogenizer until the average secondary particle size reached 0.4 μm. A 10% cerium oxide dispersion was obtained. The pulverize-dispersing operations did not result in change in the primary particle size.

Example I-13

An ink jet recording material of the present invention was produced by the same procedures as in Example I-2, except that the cationic resin (trademark: PAS-J-81) used in Example I-2 was replaced by a diallyl-dimethyl ammonium chloride-sulfur dioxide copolymer (trademark: PAS-A-5, made by NITTO BOSEKI CO., LTD.).

Example I-14

An ink jet recording material of the present invention was produced by the same procedures as in Example I-2, except that the cationic resin (trademark: PAS-J-81) used in Example I-2 was replaced by a diallylamine-maleic acid copolymer (trademark: PAS-410, made by NITTO BOSEKI CO., LTD.) of the following formula:

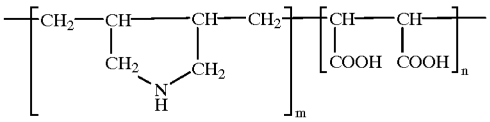

wherein a molar ratio m:n is 1:1.

TESTS

The ink jet recording materials prepared in the above-mentioned examples and comparative examples were subjected to testing of water resistance of coated layer, water resistance of printed ink images, ink-absorbing property and gloss, color density and light resistance of printed ink images, by the testing methods shown below.

Note:

(1) The printer used for the testing was a Printer PM-700C (trademark) made by EPSON CORP.

(2) In the testings for the gloss, color density and light resistance of printed ink images, a solid print prepared by the above-mentioned printer was used.

(A) Water resistance of coated layer

A sample of an ink jet recording material was immersed in water at a temperature of 20° C. for one hour, then the recording surface of the recording material in wetted condition was rubbed by finger. The result was evaluated as follows.

| Class | Rubbing result |
|---|---|
| 3 | No damage occurs on the coated layer. |
| 2 | A portion of the coated layer is removed. |
| 1 | The coated layer was completely removed. |

(B) Water resistance of printed ink images

An ink jet recording material was printed and then left to stand under conditions of a temperature of 23° C., and a relative humidity of 65% RH, for 24 hours. Then, a water drop was placed on the printed ink images for one minute, and removed by wiping. The result of water-dropping was evaluated as follows.

| Class | Water dropping result |
|---|---|
| 3 | Substantially no removal of ink images is found. |
| 2 | A portion of ink images is removed. |
| 1 | The ink images are completely removed. |

(C) Ink absorbing property

An ink jet recording material was printed with yellow, magenta and cyan-colored ink images superposed on each other to form black-colored images. Every five seconds after the completion of the printing operations, a woodfree paper sheet was press-contacted with the black-colored images to test whether the ink transfer to the paper sheet. This testing was repeated until no transfer of ink was confirmed. The time between the completion of the printing operations and the confirmation of no transfer of the black-colored ink images, namely an ink image-drying time was measured. The test result was evaluated as follows.

| Class | Ink image-drying time |
|---|---|
| 3 | 15 seconds or less |
| 2 | More than 15 seconds and less than 60 seconds |
| 1 | 60 second or more |

(D) Gloss of printed ink images

Black, yellow, cyan and magenta-colored ink images printed on an ink jet recording material were observed by the naked eye at an inclined angle, and the glosses of the images were evaluated as follows.

| Class | Gloss |
|---|---|
| 4 | The ink image gloss is similar to that on a silver salt type color photograph. |
| 3 | The ink image gloss is slightly lower than that on the silver salt type color photograph and higher than that on conventional coated or art paper sheet. |

-continued

| Class | Gloss |
|---|---|
| 2 | The ink image gloss is similar to that on conventional coated or art paper sheet. |
| 1 | The ink image gloss is very low. |

(E) Color density of printed ink images

A ink jet recording sheet was solid printed with a black-colored ink, and the colored density of the solid printed images was measured by a Macbeth refraction color density meter (RD-920). The measurement was repeated five times, and the measurement results were averaged. The averaged data were shown in Table 1.

(F) Light resistance

The printed sample was subjected to a continuous fading test using a Xenon lamp type FADE-OMETER (made by ATLAS ELECTRIC DEVICES CO., Model: CI 35F) at a temperature of 63° C. at a relative humidity of 50% for 72 hours in accordance with JIS B 7754 (1991). The color densities of the printed images before and after the fading test were measured. The light resistance of the printed images were represented by a fading rate calculated in accordance with the following equation.

$$\text{Fading rate (\%)} = \frac{D_0 - D_1}{D_0} \times 100$$

wherein $D_0$ represents a color density of the unfaded colored images, $D_1$ represents a color density of the faded colored images.

Note, the higher the fading rate, the lower the light resistance.

The test results are shown in Table 1.

TABLE 1

| Example No. | | Water-resistance of coated layer | Water-resistance of ink images | Ink-absorbing property | Gloss of print | Color density of ink images | Fading rate (%)(*) Black colored images | Fading rate (%)(*) Magenta colored images | Fading rate (%)(*) Cyan colored images | Fading rate (%)(*) Yellow colored images |
|---|---|---|---|---|---|---|---|---|---|---|
| Example | I-1 | 3 | 2 | 3 | 3 | 2.56 | 3.5 | 15.5 | 0 | 6.5 |
| | I-2 | 3 | 3 | 3 | 3 | 2.53 | 5.5 | 20.4 | 0.1 | 7.9 |
| | I-3 | 3 | 3 | 3 | 3 | 2.52 | 6.1 | 21.2 | 0 | 8.7 |
| | I-4 | 3 | 3 | 3 | 3 | 2.50 | 11.5 | 27.1 | 2.7 | 10.0 |
| | I-5 | 3 | 3 | 3 | 3 | 2.47 | 13.1 | 28.7 | 4.1 | 11.1 |
| | I-6 | 3 | 3 | 3 | 3 | 2.29 | 5.4 | 19.6 | 0 | 7.7 |
| | I-7 | 3 | 3 | 3 | 3 | 2.04 | 5.5 | 19.7 | 0.2 | 7.8 |
| | I-8 | 3 | 3 | 3 | 3 | 2.42 | 5.4 | 18.5 | 0 | 7.5 |
| | I-9 | 3 | 3 | 3 | 3 | 2.41 | 7.1 | 21.5 | 0.3 | 8.9 |
| | I-10 | 3 | 3 | 3 | 3 | 2.50 | 4.5 | 17.6 | 0 | 8.1 |
| | I-11 | 3 | 3 | 3 | 4 | 2.58 | 5.4 | 19.9 | 0.1 | 7.8 |
| Comparative Example | I-1 | 3 | 2 | 3 | 3 | 2.55 | 22.5 | 48.4 | 11.5 | 24.6 |
| | I-2 | 3 | 2 | 3 | 3 | 1.68 | 5.3 | 19.2 | 0 | 8.0 |
| | I-3 | 2 | 2 | 3 | 1 | 1.65 | 26.1 | 50.1 | 10.9 | 26.8 |
| | I-4 | 2 | 2 | 3 | 1 | 1.62 | 6.7 | 22.1 | 1.3 | 9.1 |
| | I-5 | 2 | 3 | 3 | 1 | 1.85 | 25.0 | 47.8 | 6.7 | 23.8 |
| | I-6 | 2 | 3 | 3 | 2 | 2.05 | 31.8 | 51.3 | 11.5 | 30.2 |
| | I-7 | 1 | 1 | 1 | 2 | 2.61 | 35.7 | 55.0 | 12.2 | 22.5 |
| Example | I-12 | 3 | 3 | 3 | 3 | 2.50 | 5.1 | 16.8 | 0 | 8.0 |
| | I-13 | 3 | 3 | 3 | 3 | 2.49 | 4.5 | 15.7 | 0.2 | 7.1 |
| | I-14 | 3 | 3 | 3 | 3 | 2.51 | 4.5 | 16.2 | 0.2 | 7.0 |

Note: The higher the fading rate, the lower the light resistance.

Table 1 clearly shows that the ink jet recording materials in accordance with the present invention exhibited excellent water resistance, ink absorbing property, gloss and color density of the printed ink images and a superior light resistance.

In Examples II-1 to II-8 and Comparative Examples II-1 to II-6, the following pigment particle sols were prepared and employed.

(1) Preparation of pigment sols

Silica sol AII

Synthetic amorphous silica particles (trademark: NIPSIL HD-2, made by NIPPON SILICA INDUSTRIAL CO., LTD.) having an average secondary particle size of 3 μm and an average primary particle size of 11 nm were pulverize-dispersed by a sand grinder and then further pulverize-dispersed by a pressure-type homogenizer. The pulverize-dispersing procedures by the sand grinder and the pressure-type homogenizer were alternately repeated until the average secondary particle size of the amorphous silica particles reached 75 nm, to prepare an amorphous silica sol AII having a dry solid content of 7%.

Silica sol BII

Synthetic amorphous silica particles (trademark: NIPSIL E-1011, made by NIPPON SILICA INDUSTRIAL CO., LTD.) having an average secondary particle size of 1.5 μm and an average primary particle size of 24 nm were pulverize-dispersed by a sand grinder and then further pulverize-dispersed by a pressure-type homogenizer. The pulverize-dispersing procedures by the sand grinder and the pressure-type homogenizer were alternately repeated until the average secondary particle size of the amorphous silica particles reached 200 nm, to prepare an amorphous silica sol BII having a dry solid content of 12%.

Silica sol CII

Synthetic amorphous silica particles (trademark: NIPSIL E-1011, made by NIPPON SILICA INDUSTRIAL CO., LTD.) having an average secondary particle size of 1.5 μm and an average primary particle size of 24 nm were pulverize-dispersed by a sand grinder and then further pulverize-dispersed by a pressure-type homogenizer. The pulverize-dispersing procedures by the sand grinder and the pressure-type homogenizer were alternately repeated until the average secondary particle size of the amorphous silica particles reached 350 nm, to prepare an amorphous silica sol CII having a dry solid content of 12%.

Alumina silicate sol II

Alumina silicate sol II was prepared by the same procedures as the alumina silicate sol I.

Example II-1

An aqueous coating liquid having a total solid content of 7% was prepared by mixing 100 parts of the silica sol AII with 3 parts of an ultraviolet ray absorber consisting 2-(2'-hydroxy-5'-methylphenyl)benzotriazole (trademark: SEESORB 701, made by SHIRAISHI CALCIUM CO.), 3 parts of an antioxidant consisting of 2,2'-methylene-bis(4-ethyl-6-tert-butylphenol) (trademark: ANTAGE W-500, made by KAWAGUCHI CHEMICAL CO.) and 35 parts of polyvinyl alcohol (trademark: PVA-135H, made by KURARAY CO., LTD.) having a polymerization degree of 3500 and a saponification degree of 99% or more.

A surface of a trade coated paper sheet (trademark: OK COAT, made by OJI PAPER CO., LTD.) having a basis weight of 127.9 $g/m^2$ was coated with the aqueous coating liquid and dried to form an ink receiving layer with a dry weight of 20 $g/m^2$.

An ink jet recording material of the present invention was obtained.

Example II-2

An aqueous coating liquid having a total solid content of 8% was prepared by mixing 100 parts of the silica sol AII with 15 parts of a cationic resin consisting of a copolymer of diallyldimethyl ammonium chloride with acrylamide (trademark: PAS-J-81, made by NITTO BOSEKI CO., LTD.); coagulating and thickening the mixture; pulverize-dispersing the mixture by a pressure-type homogenizer to an extent such that the average particle size of the mixture reached 100 nm; and then mixing the resultant cationic resin-containing silica sol with 3 parts of an ultraviolet ray absorber consisting of 2-(2'-hydroxy-5'-methylphenyl) benzotriazole (trademark: SEESORB 701, made by SHIRAISHI CALCIUM CO.), 3 parts of an antioxidant consisting of 2,2'-methylene-bis(4-ethyl-6-tert-butylphenol) (trademark: ANTAGE W-500, made by KAWAGUCHI CHEMICAL CO.) and 20 parts of polyvinyl alcohol (trademark: PVA-135H, made by KURARAY CO., LTD.) having a polymerization degree of 3500 and a saponification degree of 99% or more.

A surface of a trade coated paper sheet (trademark: OK COAT, made by OJI PAPER CO., LTD.) having a basis weight of 127.9 $g/m^2$ was coated with the aqueous coating liquid and dried to form an ink receiving layer having a dry weight of 20 $g/m^2$.

An ink jet recording material of the present invention was obtained.

Example II-3

An ink jet recording material of the present invention was produced by the same procedures as in Example II-2, except that as an antioxidant, 4,4'-thio-bis(3-methyl-6-tert-butylphenol) (trademark: SUMIRIZER WX, made by SUMITOMO CHEMICAL CO., LTD.) was employed.

Example II-4

An ink jet recording material of the present invention was produced by the same procedures as in Example II-2, except that as an antioxidant, 1,1,3-tris(2-methyl-4-hydroxy-5-cyclohexylphenyl)butane (trademark: ARKLS DH-43, made by ASAHI DENKA KOGYO K. K.) was employed.

Example II-5

An ink jet recording material of the present invention was produced by the same procedures as in Example II-2, except that as an antioxidant, dilauryl 3,3-thio-dipropionate (trademark: SUMIRIZER-TPL, made by SUMITOMO CHEMICAL CO., LTD.) was employed.

Example II-6

An ink jet recording material of the present invention was produced by the same procedures as in Example II-2, except that the silica sol AII was replaced by the silica sol BII.

Example II-7

An ink jet recording material of the present invention was produced by the same procedures as in Example II-2, except that the silica sol AII was replaced by the alumina silicate sol II.

Example II-8

The same aqueous coating liquid as in Example II-2 was coated on a surface of a casting film consisting of a PET film (trademark: LUMILAR T, made by TORAY INDUSTRIES INC.) having a thickness of 50 μm and a surface roughness Ra of 0.02 μm, and dried to form a cast-coated layer corresponding to an outermost ink receiving layer and having a dry weight of 15 $g/m^2$.

A 10% aqueous coating liquid for an additional ink receiving layer was prepared by mixing 100 parts of the silica sol BII with 25 parts of polyvinyl alcohol (trademark: PVA-135H, made by KURARAY CO., LTD.) having a polymerization degree of 3500 and a saponification degree of 99% or more. The resultant coating liquid was coated on a surface of a trade woodfree paper sheet having a basis weight of 127.9 g/$m^2$ to form an additional ink receiving layer having a weight corresponding to a dry weight of 10 g/$m^2$.

The additional ink receiving layer on the support sheet was superposed on and bonded to the cast-coated layer on the casting PET film, dried, and then the PET film was removed from the cast-coated layer.

An ink jet recording material of the present invention was obtained.

Comparative Example II-1

An aqueous coating liquid having a total solid content of 7% was prepared by mixing 100 parts of the silica sol AII with 35 parts of polyvinyl alcohol (trademark: PVA-135H, made by KURARAY CO., LTD.) having a polymerization degree of 3500 and a saponification degree of 99% or more.

The aqueous coating liquid was coated on a surface of a trade coated paper sheet (trademark: OK COAT, made by OJI PAPER CO., LTD.) having a basis weight of 127.9 g/$m^2$ and dried to form an ink receiving layer having a dry weight of 20 g/$m^2$.

A comparative ink jet recording material was obtained.

Comparative Example II-2

An aqueous coating liquid having a total solid content of 10% was prepared by mixing 100 parts of the silica sol CII with 3 parts of an ultraviolet ray absorber consisting of 2-(2'-hydroxy-5'-methylphenyl)benzotiazole (trademark: SEESORB 701, made by SHIRAISHI CALCIUM CO.), 3 parts of an antioxidant consisting of 2,2'-methylene-bis(4-ethyl-6-tert-butylphenol) (trademark: ANTAGE W-500, made by KAWAGUCHI CHEMICAL CO.) and 35 parts of polyvinyl alcohol (trademark: PVA-135H, made by KURARAY CO., LTD.) having a polymerization degree of 3500 and a saponification degree of 99% or more.

The aqueous coating liquid was coated on a surface of a trade coated paper sheet (trademark: OK COAT, made by OJI PAPER CO., LTD.) having a basis weight of 127.9 g/$m^2$ and dried to form an ink receiving layer having a dry weight of 20 g/$m^2$.

A comparative ink jet recording material was obtained.

Comparative Example II-3

An aqueous coating liquid having a total solid content of 10% was prepared by mixing 100 parts of amorphous silica (trademark: FINESIL 45, made by TOKUYAMA CORP.) having an average particle size of 4.5 $\mu$m with 3 parts of an ultraviolet ray absorber consisting of 2-(2'-hydroxy-5'-methylphenyl)benzotriazole (trademark: SEESORB 701, made by SHIRAISHI CALCIUM CO.), 3 parts of an antioxidant consisting of 2,2'-methylene-bis(4-ethyl-6-tert-butylphenol) (trademark: ANTAGE W-500, made by KAWAGUCHI CHEMICAL CO.) and 30 parts of silyl-modified polyvinyl alcohol (trademark: R-1130, made by KURARAY CO., LTD.).

The aqueous coating liquid was coated on a surface of a trade coated paper sheet (trademark: OK COAT, made by OJI PAPER CO., LTD.) having a basis weight of 127.9 g/$m^2$ and dried to form an ink receiving layer having a dry weight of 20 g/$m^2$.

A comparative ink jet recording material was obtained.

Comparative Example II-4

A trade non-gloss-type ink jet recording paper sheet, namely a mat paper sheet (trademark: MJA4SP1, made by EPSON CORP.) was subjected to the tests which will be described later.

Comparative Example II-5

A trade gloss ink jet recording paper sheet (trademark: GP-101, made by CANON CORP.) was subjected to the tests which will be described later.

Comparative Example II-6

A trade gloss ink jet recording paper sheet (trademark: PHOTO JET PAPER-GLOSS SHEET KJPA 4-GH20, made by KONIKA CO.) was subjected to the tests which will be described below.

TESTS

The ink jet recording materials prepared in the above-mentioned examples and comparative examples were subjected to testing of water resistance of coated layer, water resistance of printed ink images, ink-absorbing property and gloss, color density and light resistance of printed ink images, by the testing methods shown below.

Note:

(1) The printer used for the testing was a Printer PM-700C (trademark) made by EPSON CORP.

(2) In the testings for the gloss, color density and light resistance of printed ink images, a solid print prepared by the above-mentioned printer was used.

(A) Water resistance of coated layer

A sample of an ink jet recording material was immersed in water at a temperature of 20° C. for one hour, then the recording surface of the recording material in wetted condition was rubbed by finger. The result was evaluated as follows.

| Class | Rubbing result |
|---|---|
| 3 | No damage occurs on the coated layer. |
| 2 | A portion of the coated layer is removed. |
| 1 | The coated layer was completely removed. |

(B) Water resistance of printed ink images

An ink jet recording material was printed and then left to stand under conditions of a temperature of 23° C., and a relative humidity of 65% RH, for 24 hours. Then, a water drop was placed on the printed ink images for one minute, and removed by wiping. The result of water-dropping was evaluated as follows.

| Class | Water dropping result |
|---|---|
| 3 | Substantially no removal of ink images is found. |
| 2 | The ink images are partially removed. |
| 1 | The ink images are completely removed. |

(C) Ink absorbing property

An ink jet recording material was printed with yellow, magenta and cyan-colored ink images superposed on each other to form black-colored images. Every five seconds after the completion of the printing operations, a woodfree paper sheet was press-contacted with the black-colored images to test whether the ink transfer to the paper sheet. This testing was repeated until no transfer of ink was confirmed. The time between the completion of the printing operations and the confirmation of no transfer of the black-colored ink images, namely an ink image-drying time was measured. The test result was evaluated as follows.

| Class | Ink image-drying time |
|---|---|
| 3 | 15 seconds or less |
| 2 | More than 15 seconds and less than 60 seconds |
| 1 | 60 second or more |

(D) Gloss of printed ink images

Black, yellow, cyan and magenta-colored ink images printed on an ink jet recording material were observed by the naked eye at an inclined angle, and the glosses of the images were evaluated as follows.

| Class | Gloss |
|---|---|
| 4 | The ink image gloss is similar to that on a silver salt type color photograph. |
| 3 | The ink image gloss is slightly lower than that on the silver salt type color photograph and higher than that on conventional coated or art paper sheet. |
| 2 | The ink image gloss is similar to that on conventional coated or art paper sheet. |
| 1 | The ink image gloss is very low. |

(E) Color density of printed ink images

An ink jet recording sheet was solid printed with a black-colored ink, and the colored density of the solid printed images was measured by a Macbeth refraction color density meter (RD-920). The measurement was repeated five times, and the measurement results were averaged. The averaged data were shown in Table 1.

(F) Light resistance

The printed sample was subjected to a continuous fading test using a Xenon lamp type FADE-OMETER (made by ATLAS ELECTRIC DEVICES CO., Model: CI 35F) at a temperature of 63° C. at a relative humidity of 50% for 72 hours in accordance with JIS B 7754 (1991). The color densities of the printed sample before and after the fading test were measured. The light resistance of the printed images were represented by a fading rate calculated in accordance with the following equation.

$$\text{Fading rate}\,(\%) = \frac{D_0 - D_1}{D_0} \times 100$$

wherein $D_0$ represents a color density of the unfaded colored images, $D_1$ represents a color density of the faded colored images.

Note, the higher the fading rate, the lower the light resistance.

The test results are shown in Table 2.

TABLE 2

| Example No. | | Item | | | | | | | | |
|---|---|---|---|---|---|---|---|---|---|---|
| | | Water-resistance of coated layer | Water-resistance of ink images | Ink-absorbing property | Gloss of print | Color density of ink images | Fading rate (%)(*) | | | |
| | | | | | | | Black colored images | Magenta colored images | Cyan colored images | Yellow colored images |
| Example | II-1 | 3 | 2 | 3 | 3 | 2.49 | 4.5 | 12.3 | 0.1 | 6.0 |
| | II-2 | 3 | 3 | 3 | 3 | 2.47 | 5.2 | 14.5 | 0 | 7.1 |
| | II-3 | 3 | 3 | 3 | 3 | 2.47 | 5.4 | 15.1 | 0 | 6.8 |
| | II-4 | 3 | 3 | 3 | 3 | 2.48 | 7.2 | 17.8 | 0.9 | 9.9 |
| | II-5 | 3 | 3 | 3 | 3 | 2.44 | 13.5 | 24.5 | 2.6 | 13.5 |
| | II-6 | 3 | 3 | 3 | 3 | 2.28 | 5.1 | 15.0 | 0.1 | 7.0 |
| | II-7 | 3 | 3 | 3 | 3 | 2.42 | 4.9 | 13.5 | 0 | 7.2 |
| | II-8 | 3 | 3 | 3 | 4 | 2.51 | 5.1 | 14.5 | 0 | 6.5 |
| Comparative Example | II-1 | 3 | 2 | 3 | 3 | 2.47 | 20.5 | 45.2 | 10.1 | 21.5 |
| | II-2 | 3 | 2 | 3 | 3 | 1.71 | 5.9 | 15.5 | 0.1 | 9.1 |
| | II-3 | 2 | 2 | 3 | 1 | 1.62 | 7.2 | 18.2 | 1.2 | 10.5 |
| | II-4 | 2 | 3 | 3 | 1 | 1.85 | 22.5 | 44.3 | 5.6 | 20.8 |
| | II-5 | 2 | 3 | 3 | 2 | 2.03 | 30.1 | 49.2 | 10.1 | 29.8 |
| | II-6 | 1 | 1 | 1 | 2 | 2.59 | 33.5 | 52.7 | 13.1 | 23.3 |

Table 2 clearly shows that the ink jet recording materials in accordance with the present invention exhibited excellent water resistance of the coated layer, ink absorbing property, gloss and color density of the printed ink images and a superior light resistance.

What we claim is:

1. An ink jet recording material comprising a support and one or more ink-receiving layers formed on the support, wherein at least one of the ink receiving layers comprises:

(1) fine colloid pigment particles selected from the group consisting of fine colloid amorphous silica secondary particles having an average secondary particle size of 10 to 300 nm and each consisting essentially of a plurality of primary particles having an average primary particle size of 3 to 40 nm and agglomerated with each other;

(2) an ultraviolet ray-absorber comprising at least one member selected from the group consisting of ultraviolet ray-absorbing benzotriazole compounds in the form of fine particles having an average particle size of 2 μm or less;

(3) a binder; and (4) a cationic compound.

2. The ink jet recording material as claimed in claim 1, wherein the at least one ink receiving layer comprising the fine colloid pigment particles (1), the ultraviolet ray absorber (2) and the binder (3) further comprises an anti-oxidant.

3. The ink jet recording material as claimed in claim 2, wherein the antioxidant comprises at least one member selected from antioxidant phenolic compounds.

4. The ink jet recording material as claimed in claim 2, wherein the antioxidant comprises at least one member selected from the group consisting of 2,2'-methylene-bis (4-ethyl-6-tert-butylphenol), 4,4'-thiobis (3-methyl-6-tert-butylphenol), 1,1,3-tris-(2- methyl-4-hydroxy-5-tert-butylphenyl) butane, and 1,1,3- tris(2-methyl-4-hydroxy-5-cyclohexylphenyl) butane.

5. The ink jet recording material as claimed in claims 1 or 2, wherein the cationic compound is selected from the group consisting of polymers of diallyldimethyl ammonium chloride, copolymers of diallyldimethyl ammonium chloride with sulfur dioxide and copolymers of at least one amine with at least one carboxylic acid.

6. The ink jet recording material as claimed in claim 1 or 2, wherein the ultraviolet ray absorber is in the form of fine particles having an average particle size of 500 nm or less.

7. The ink jet recording material as claimed in claim 1 or 2, wherein in the ultraviolet ray absorber, the secondary particles having an average secondary particle size of 2 μm or less each consist essentially of a plurality of primary particles having an average primary particle size of 3 to 100 nm and agglomerated with each other.

8. The ink jet recording material as claimed in claim 1, wherein the ink receiving layer containing the fine colloid pigment particles and the ultraviolet ray absorber forms an outermost layer to which an ink jet printing is applied, and at least one additional ink receiving layer is formed between the outermost ink receiving layer and the support.

9. The ink jet recording material as claimed in claim 1, wherein the at least one ink receiving layer is formed by coating a casting surface with a at least one coating layer corresponding to the ink receiving layer;

transferring and bonding the cast-coated layer on the casting surface to a surface of the support;

and removing the casting surface from the transferred cast-coated layer.

10. The ink jet recording material as claimed in claim 9, wherein the at least one ink receiving layer is formed by coating a casting surface with at least one coating layer corresponding to the ink receiving layer;

transferring and bonding the cast-coated layer to a surface of an additional ink receiving layer directly formed on the support;

and removing the casting surface from the transferred cast-coated layer.

11. The ink jet recording material as claimed in claim 1, wherein the cationic compound is a cationic polymer having a molecular weight of 50,000 or more.

12. The ink jet recording material as claimed in claim 11, wherein the cationic polymer has a molecular weight of 100,000 to 400,000.

13. The ink jet recording material as claimed in claim 1, wherein the cationic compound is present in a content of 1 to 30 parts by weight per 100 parts by weight of the colloid pigment particles.

14. The ink jet recording material as claimed in claim 13, wherein the content of the cationic compound is 5 to 20 parts by eight per 100 parts by weight of the colloid pigment particles.

* * * * *